UNITED STATES PATENT OFFICE.

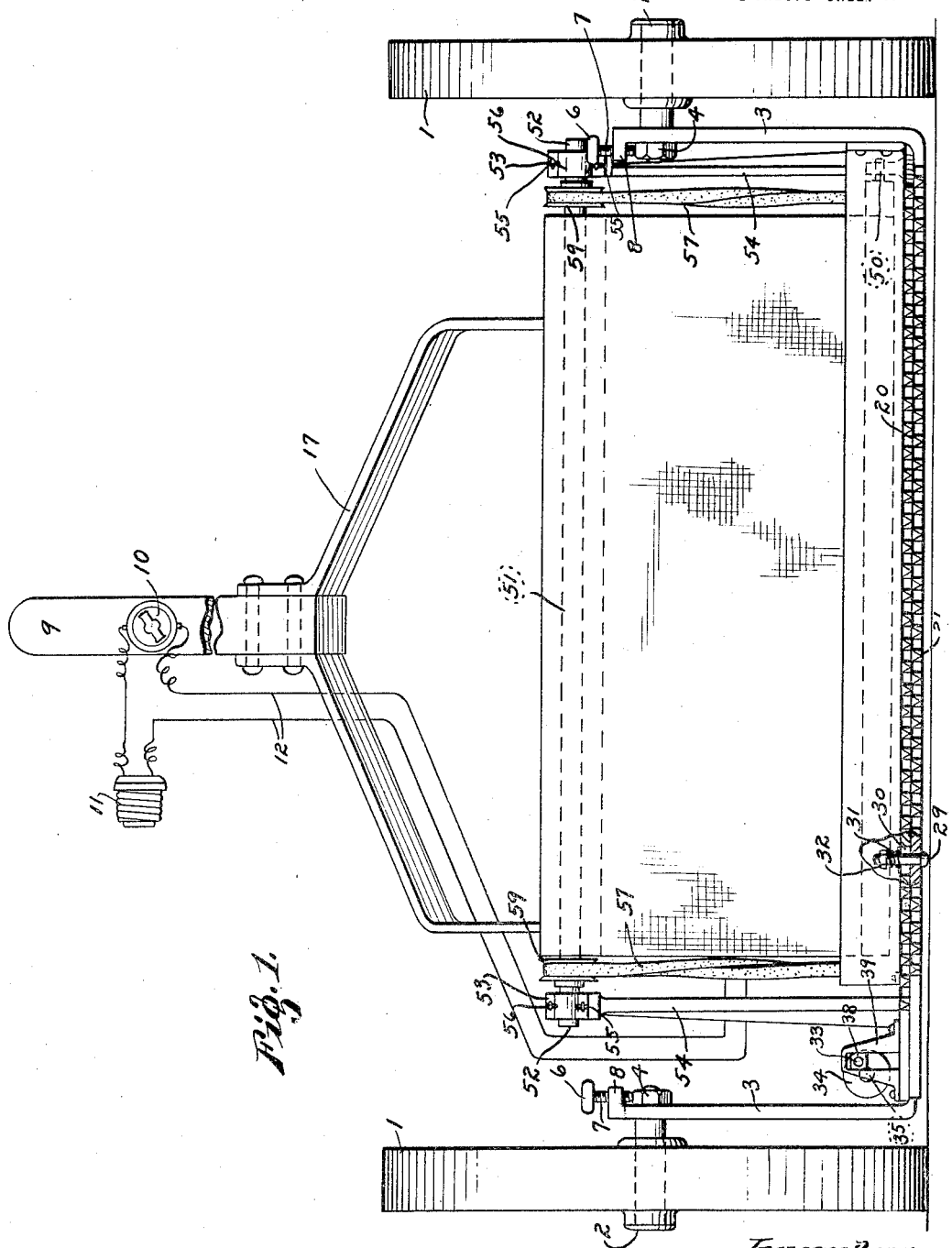

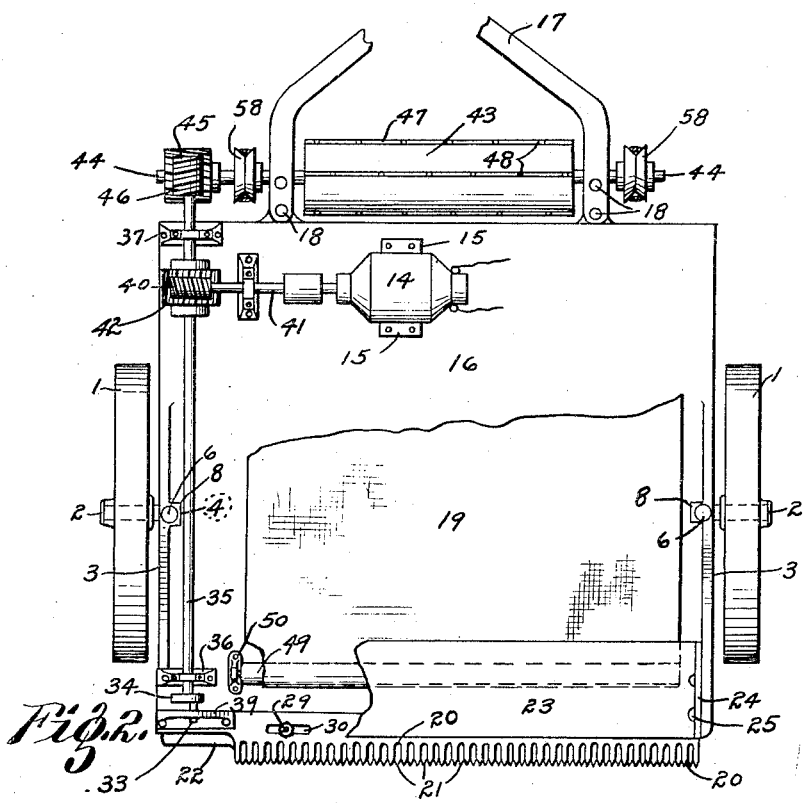
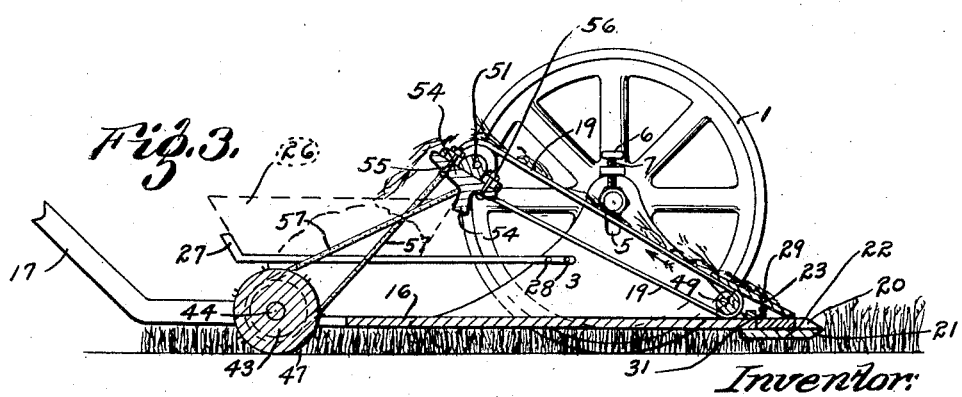

WILLIAM E. VOGES, OF ST. LOUIS, MISSOURI.

TRACTOR LAWN-CUTTER.

1,383,178.　　　　Specification of Letters Patent.　　Patented June 28, 1921.

Application filed February 2, 1920. Serial No. 355,716.

*To all whom it may concern:*

Be it known that I, WILLIAM E. VOGES, a citizen of the United States, residing at St. Louis, in the State of Missouri, have invented certain new and useful Improvements in Tractor Lawn-Cutters, of which the following is a specification containing a full, clear, and exact description, reference being had to the accompanying drawings, forming a part hereof.

My invention consists in the novel construction and combination of parts hereinafter particularly described and distinctly claimed.

The object of my invention is to provide an improved traction-mechanism for lawn-cutters, which have a cutter that is positively driven by the same motor that drives the traction-roller of the machine, and which motor is carried by the frame of the machine.

A further object of my invention is to improve upon the construction of the machine which forms the subject-matter of my U. S. Patent No. 1,323,337, granted to me under date of December 2, 1919, whereby the length of the cutter and the width of the inclined endless grass-carrier will be increased, with a consequent increase in capacity of the machine, without an appreciable increase in the weight thereof.

A further object of my invention is to arrange the motor (which drives the machine) in a position in the rear of the machine and under the rear portion of the endless grass-carrier thereof.

In the drawings:—

Figure 1 is a front view, tractor lawn-cutter having my invention embodied therein.

Fig 2 is a fragmentary top plan view of the machine, having the handle and other parts broken away, and Fig. 3 is a vertical cross-section, taken on the line 3—3 of Fig. 2.

In carrying out my invention I provide two large supporting-wheels 1, in order to make the machine move with the least friction, and these wheels are mounted upon axle-studs 2 that are clamped to the vertical end-plates 3 of the frame by suitable nuts 4 which are threaded upon the inner ends of said studs.

Said studs 2 are adjustably mounted in vertical slots 5 in the said end-plates, whereby the front end of the frame of the machine can be raised or lowered, to cause the cutter to cut the grass or other material short or long. Fig. 3.

Hand-wheels 6 are mounted upon the upper end of vertical adjusting-screws 7, which are threaded through horizontal ears 8 that extend inwardly from the upper edge of said vertical end-plates 3 and overhang the said nuts 4, so that the lower end of said adjusting-screws will engage the said nuts and push the said axle-studs farther down in said slots (after said nuts have been loosened) in raising the front end of the machine, to make the cutter leave the standing stalks or blades longer.

To lower the cutter, all that is necessary is to loosen the said nuts 4 and turn the said hand-wheels 6 in a reverse direction, whereupon the weight of the machine will force the studs 2 upwardly in the said vertical slots 5 until the desired position is reached, when the said nuts should be tightened up, to lock the studs securely to the said end-plates 3.

Mounted on the top surface of the usual handle 9, at a point convenient for the operator, is the motor-controlling mechanism, in the present case is a common electric-switch 10 and an ordinary electric-lamp plug 11, from which wires or conductors 12 lead to the electric-motor 14, which latter is mounted on a suitable base or bracket 15 that rests upon the horizontal frame-plate 16 of the machine.

The said horizontal frame-plate 16 connects the lower edges of the two vertical end-plates 3, before mentioned.

A handle-bail 17 is rigidly connected to the rear edge of the said horizontal frame-plate 16 by means of common rivets or bolts 18.

It will be observed that the said large supporting-wheels 1 and their axle-studs 2 are located approximately at the center of the length of the frame of the machine, so that the entire weight of the machine (except that of the rear portion thereof) will be almost balanced fore and aft on said wheels; thereby permitting the machine to be rocked upon said wheels to a limited degree, by raising and depressing the said handle 9, in placing more or less weight upon the traction-roll (or wheel) hereinafter described, to increase, diminish or destroy the tractive effort of said roll or wheel, during the operation of the machine.

This is an important part of my invention, inasmuch as the lifting and depression of the rear portion of the machine by its handle controls the traction of the machine, by raising the traction-roll (or wheel) from the ground to stop the machine and (in many cases) to temporarily start it by allowing the said roll to rest heavily or lightly upon the ground; all of which is accomplished by lifting upon and depressing the handle 9, without the use of the usual friction-clutch or any other kind of a clutch.

With such a construction, no clutch is necessary between the motor and the traction-roll or traction wheel.

In the present form of my invention, the said motor 14 is located on said base 15 at about the longitudinal center of the said horizontal frame-plate 16, in a space beneath the rear end of an endless grass-carrier 19, which extends rearwardly and upwardly from a point slightly in the rear of a reciprocating cutter 20. It will of course be understood that said reciprocating cutter 20 may be replaced by the well-known rotary cutter.

The said reciprocating cutter 20 is, in the present illustration of my invention, made of a steel bar having parallel teeth projecting from its front edge, and adapted to be reciprocated above and in close contact with a series of like teeth 21 carried by the front edge of a fixed plate 22 riveted or bolted to the front edge of the said horizontal frame-plate 16, so that as the said cutter is reciprocated during the forward movement of the machine, the grass or weeds will be caught between the teeth of said cutter and said fixed plate, and be cut the desired length from the ground, and the cut grass or weeds will fall backward onto a fixed inclined receiving-plate 23 which has its ends provided with vertical flanges 24 that are secured to the said vertical end-plates 3 of the frame by means of common rivets 25. See Fig. 2.

The cut material will be discharged rearwardly from the said fixed inclined receiving-plate 23 upon the lower end of the said endless carrier 19, and be thereby carried rearwardly and upwardly, and discharged at the rear of the machine, into a grass-pan or basket 26 that is detachably supported by arms or a frame 27 connected to the said vertical end-plates 3 by means of rivets or screws 28. See Fig. 3.

The said cutter 20 is held in yielding contact with the said toothed-plate 22 by means of bolts 29 rising from the said toothed-plate and passing through longitudinal slots 30 in said cutter, and coiled-springs 31 mounted on said bolts above said slots, said bolts having nuts 32 by means of which the pressure of said springs upon the said cutter is regulated when required.

Motion is communicated to the said cutter 20 by means of a crank-pin 33 projecting from a crank-disk 34 carried by the front end of a rearwardly-extending drive-shaft 35 and driven by the motor 14 in the manner that will be presently described in detail.

The front end of the said drive-shaft 35 is mounted in a common bearing 36 (or rather a common bracket) that is fixed on the upper surface of the said horizontal frame-plate 16, while the rear portion of said shaft is mounted in a similar bearing or bracket 37 at the rear end of said frame-plate.

Said crank-pin 33 has mounted upon it a common sliding-bearing 38 that is rectangular in form and arranged to slide vertically in a well-known guide-bracket 39 having the usual vertical run-way to retain said bearing 38 during the rotation of said crank-pin, the said guide-bracket being mounted upon one end of the said cutter 20 and being secured thereto by suitable rivets or screws, so that as the said crank-disk 34 is revolved by the motor the said cutter will be reciprocated at about 350 revolutions per minute. See Figs. 1 and 2.

A common worm 40 is fixed upon the armature-shaft 41 of the said motor 14, to mesh with the teeth of a worm-gear 42 that is carried by the said horizontal drive-shaft 35, whereby the said motor drives the said shaft and imparts a reciprocating motion to the said cutter.

The machine is driven from the rear by a traction-roll 43 that has its end-pintles mounted in suitable bearings attached to the underside of the said handle-bail 17 or to some other part of the machine.

The numeral 44 designates the pintle-shaft of the said traction-roll 43, said shaft being extended at each side of the machine past the bearings in which it is mounted, and a common worm gear 45 is fixed upon one of said extensions of said shaft so that the teeth of said gear will mesh with a worm 46 that is fixed upon the rear end of the said drive-shaft 35.

Longitudinal strips of metal 47 that are U-shaped in cross-section are secured upon the periphery of the said traction-roll 43 by means of common fastening-devices 48, whereby the outwardly projecting edges of said strips will dig into the ground and prevent slipping of the said traction-roll.

Instead of said strips 47 any common form of teeth or ribs, or it may be spikes, can be fixed on the outer surface of the traction-roll, to give the same the desired and necessary hold upon the earth, in pushing the machine by the power of the motor. (See Fig. 2.)

The said endless-carrier consists of a common belt 19, and suitable mountings therefor in the form of a bottom roll 49 having its pintles mounted in suitable bearing-brackets 50 fixed on the said horizontal frame-plate 16 beneath the said inclined grass receiving-plate 23, and other parts now to be described.

The upper end of said endless-carrier 19 is mounted on a top roll 51 whose pintles 52 are mounted in bearings 53 located at the upper ends of vertical bearing-stands or brackets 54 which rise from the said horizontal frame-plate 16.

Said bearings 53 of the said top roll 51 are made adjustable by means of slots 55 in the caps or bases of said bearings engaged by bolts 56, whereby the belt may be tightened or loosened as required. See Fig. 3.

Motion is communicated to the said endless-carrier 19 by common crossed-belts 57 running upon well-known forms of belt-wheels or pulleys 58 fixed upon the said pintle-shaft 44 of the said traction-roll 43 at each end thereof, and upon pulleys or wheels 59 fixed upon the pintles 52 of the said top roll 51 of the said endless-carrier.

The operation of my invention will be readily apparent from the above description, taken in connection with the drawings, except to state that when it is desired to stop the machine, in turning out of the way of an obstruction, or in turning a short corner, all that will be necessary will be for the operator to lift the traction-roll 43 off of the ground, and the machine will come to a stop, even if the motor is allowed to continue running.

The said motor 14 is of the well-known constant-speed form, so that even when the load is removed it will not run at excessive speed.

In driving the machine up hill, or in cutting heavy weeds, the traction may be increased by the operator bearing down upon the handle 9 of the machine, thereby placing a greater weight upon said traction-roll 43; and likewise, the tractive-effort may be lessened by lifting part of the weight off of said roll and allowing it to slip upon the ground; all of which may be done while the motor is running and the cutter 20 is reciprocating.

Such a construction and method of operation obviates the necessity of any kind of a clutch between the motor and the traction-roll or the motor and the cutter, and enables me to produce a tractor electric lawn-cutter that is very simple, of low cost, and that is not likely to get out of order.

I claim:

1. A tractor lawn-cutter, comprising a frame, a reciprocating-cutter mounted at the front of said frame, two ground-wheels which support the front end of said frame and hold said cutter at the desired height from the ground, means for adjusting the frame upon the said wheels, to regulate the height of the cutter above the ground, a motor and suitable connections mounted upon said frame, a traction device that supports the rear portion of the machine, means for driving said traction device by the power of said motor, means for driving said cutter by the power of said motor, and a handle connected to said frame and arranged to transfer more or less of the weight of the driver or operator to the said traction device, and whereby the said traction device may be lifted clear of the ground, to stop the machine without stopping said motor.

2. In a tractor lawn-cutter, a single long horizontal traction-roll which normally rests in contact with the ground at the rear of the machine; a frame; a cutter at the front of said frame; large supporting-wheels upon which said frame is supported and approximately balanced fore-and-aft at a point about midway of said frame; a motor geared directly to the said traction-roll and to said cutter, to drive them both, and means for lifting said traction-roll clear of the ground, to stop the advance of the machine while said motor continues to run.

3. A tractor lawn-cutting machine, constructed with a reciprocating cutter at its front, large supporting-wheels that adjustably hold said cutter a distance above the ground, a frame supported at its front by the said wheels only, a traction-roll mounted in the rear portion of said machine and having non-slip devices applied to its outer surface, a motor carried by said frame, means connecting said traction-roll to the said motor, means connecting said cutter to said motor, and screws having hand-wheels at their upper ends for adjusting the height of the cutter-carrying front end of the machine.

4. A tractor lawn-cutting machine, comprising a suitable frame, a reciprocating cutter mounted at the front of said frame, an inclined endless-carrier mounted in the rear of said cutter to elevate the cut material as it passes back of the said cutter, a motor mounted on said frame in the space behind said endless-carrier, a traction-roll mounted at the rear of said frame to push the machine forward, means for connecting said traction-roll to said motor, means for connecting said cutter to said motor, means for connecting said endless-carrier to said motor, and a handle for lifting said traction-roll off the ground and for varying its traction.

5. A tractor lawn-cutting machine, constructed with its frame weight approximately balanced fore-and-aft upon supporting wheels, a cutter at the front, a single long horizontal traction-roll at the rear, a motor, means for connecting said cutter and said traction-roll to said motor, and means for stopping, starting, and varying the speed of the machine on the ground, by lifting said roll from the ground and placing same in contact therewith while said cutter and said traction-roll are running at full speed.

6. A tractor electric lawn-cutting machine, constructed with a reciprocating cutter at its front, a vertical stand having a vertical slot and fixed upon said cutter, a drive-shaft having a crank-pin connected to it, a slide-bearing mounted to reciprocate vertically in the vertical slot of the said stand, a traction-roll at the rear of the machine, an electric motor carried by said machine, a worm fixed on the armature-shaft of said motor, a worm-gear fixed on said drive-shaft and meshing with the said worm on said motor shaft, a worm fixed on the rear portion of the said drive-shaft, a toothed-gear on the pintle of the said traction-roll in mesh with the worm on said drive-shaft, an endless grass-carrier mounted in the rear of the said cutter to receive and carry upwardly and to the rear the cut grass or other material, a cut-grass holding means in the rear of and beneath the elevated rear end of the said endless-carrier, means for connecting said endless-carrier to the said motor, and a handle in the rear of the machine, for lifting said traction-roll clear of the ground and for imparting to said roll more or less weight, for the purpose of varying its traction while the said motor, cutter, traction-roll and endless-carrier are in motion.

In testimony whereof I have signed my name to this specification in presence of two subscribing witnesses.

WILLIAM E. VOGES

Witnesses:
　FRANCES E. MORRIS,
　JOHN C. HIGDON.